United States Patent [19]

Kudelski

[11] Patent Number: 5,134,656
[45] Date of Patent: Jul. 28, 1992

[54] PRE-PAYMENT TELEVISION SYSTEM USING A MEMORY CARD ASSOCIATED WITH A DECODER

[75] Inventor: Andre Kudelski, Crissier, Switzerland

[73] Assignee: Kudelski S.A. Fabrique d'Enregistruers Nagra

[21] Appl. No.: 598,689
[22] PCT Filed: Feb. 21, 1990
[86] PCT No.: PCT/CH90/00040
 § 371 Date: Oct. 19, 1990
 § 102(e) Date: Oct. 19, 1990
[87] PCT Pub. No.: WO90/10354
 PCT Pub. Date: Sep. 7, 1990

[30] Foreign Application Priority Data

Feb. 22, 1989 [FR] France .................. 89/02472

[51] Int. Cl.$^5$ ............................................. H04N 7/167
[52] U.S. Cl. ................................. 380/16; 380/21; 380/43; 380/50; 380/48
[58] Field of Search ................. 380/16, 20, 21, 43, 380/45, 46, 48, 49, 50

[56] References Cited

U.S. PATENT DOCUMENTS

| | | | |
|---|---|---|---|
| 4,369,434 | 1/1983 | Mueller | 380/46 X |
| 4,736,419 | 4/1988 | Roe | 380/46 X |
| 4,771,458 | 9/1988 | Citta et al. | 380/20 |
| 4,890,324 | 12/1989 | Jansen | 380/43 |
| 5,016,275 | 5/1991 | Smith | 380/43 |

FOREIGN PATENT DOCUMENTS

| | | |
|---|---|---|
| 0021938 | 1/1981 | European Pat. Off. . |
| 0247703 | 12/1987 | European Pat. Off. . |
| 83/01881 | 5/1983 | PCT Int'l Appl. . |
| 84/00656 | 2/1984 | PCT Int'l Appl. . |
| 2161680 | 1/1986 | United Kingdom ............ 380/21 |

Primary Examiner—Tod Swann
Attorney, Agent, or Firm—Davis, BuJold & Streck

[57] ABSTRACT

According to the invention, on the emitter side, a number generator (10) delivers a random code (XAL) which is sent to the input of a master card (11) which ciphers such code according to a predetermined key (100), the code thus ciphered is broadcast with the video signal, a first device (17) receives, on the one hand, the random code (XA) and, on the other hand, the code ciphered by the master card (11) and effects a predetermined numerical combination of these two codes, such combination forming the initialization word of a pseudo-random generator (12) intended to provide a table of codes for scrambling the video signal and, on the receiver side, the ciphered code received is deciphered by a customer card (13), a second device (18) receives at the inputs, on the one hand, the ciphered code and, on the other hand, the code deciphered (XA) by the customer card (13) and effects a numerical combination of these two codes which is similar to the combination of the first device (17).

3 Claims, 2 Drawing Sheets

PRE-PAYMENT TELEVISION SYSTEM USING A MEMORY CARD ASSOCIATED WITH A DECODER

The present invention relates to a pay-television system or device using a memory card associated with a decoder.

In pay-television systems or devices, the video and audio signal designed to be broadcast is first scrambled according to an ordinary process and is then transmitted by antenna, satellite, or cable. At the end, the signal is received and unscrambled at the home of each subscriber by means of a specific device usually called "decoder".

In advanced pay-television systems known at present, the decoder mainly comprises an electronic device designed to unscramble or decode the video picture. To this decoder is associated a memory card or a card including an integrated circuit, mainly designed to control the access to broadcasts and to manage the credit required to buy those broadcasts or emissions.

In such pay-television systems an arbitrary word or code is emitted during the broadcast; this word is designed for initializing a pseudo-random generator determining a code table. This code table is used for scrambling the video signal. This initialization word is enciphered by a predetermined enciphering key, and the enciphered initialization word is broadcasted with the video signal. In the subscriber's decoder, the enciphered initialization word is deciphered by the same key so as to be reproduced in clear and to be used as an initialization word for a pseudo-random generator which is identical to that of the emission and consequently generates an identical code table. Then, this code table is used for unscrambling the video signal which can then be sent to the television set.

In the following, the "broadcasting company" is to be meant as a person or company having the rights to emit scrambled broadcast (also called coded broadcast) and who rents to its subscribers a specific decoder or a specific card usable with a non specific decoder, the latter being liable to be used to decode the broadcasts issued by other broadcasting companies. In the following, "main card" is to be meant as a card or a device designed to encipher the initialization word by using a specific key of a broadcasting company and "subscriber card" is to be meant as a card or equivalent device rented to the subscriber.

The memory card has numerous advantages among which the advantage of being simultaneously usable by several broadcasting companies. However, this memory card may exhibit some drawbacks, such as piracy, that will be explained hereinafter.

In the case of a memory card designed to be used by several broadcasting companies, a broadcasting company A can write on each card its keys and rights and another broadcasting company B can independently write on the same cards or other cards its keys and rights. In this case, it may happen that a person well informed gets a subscriber's card and uses it for deciphering the initialization word that has been sent enciphered with the video signal emitted by the broadcasting company A. Then, a main card is used for enciphering this initialization word according to the other key used by another broadcasting company, e.g. by the broadcasting company B. Thus, said person sends to his subscribers the broadcasts from the broadcasting company A transferred into the card network of broadcasting company B.

The aim of the invention is to remedy the hereinabove mentioned drawback.

The invention relates to a pay-television system using a memory card associated with a decoder.

According to a characteristic of the invention, on the emission side, a digital generator supplies a random code which is sent to the input of a main card that enciphers this code by using a predetermined key. The so enciphered code is emitted with the video signal. A first device receives at the inputs, on the one hand, the random code and, on the other hand, the code enciphered by the main card and carries out a determined digit combination of those two codes, these combination forming the initialization word of a pseudo-random generator which is intended to supply a code table designed to scramble the video signal. On the reception side, the decoder receives the enciphered code that is deciphered by a subscriber card. A second device receives at the inputs, on the one hand, the enciphered code and, on the other hand, the code deciphered by the subscriber card and carries out a digital combination of those two codes, this combination being identical to the one of the first device. The result of this combination constitutes the initialization word for another pseudo-random generator supplying a code table identical to the one of the emission; then this code table is designed to unscramble the video signal.

In an embodiment of the invention, the first and second devices carry out the same digital combination whose function is such that the reciprocal function can be determined only by a very difficult complete test.

In another embodiment of the invention, the first and second devices carry out the same digital combination of binary digits and whose function is an Exclusive OR function.

Those objects, features and advantages and others of the instant invention shall be disclosed in more details in the following description of a preferred embodiment in connection with the attached drawings wherein.

Figure 1:
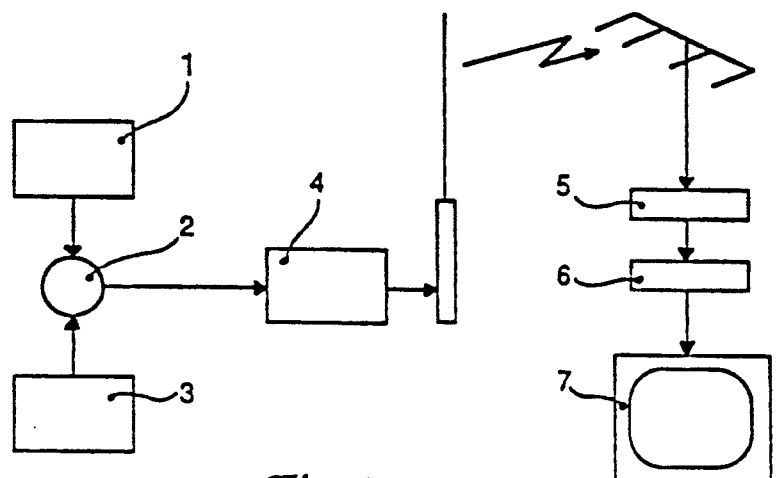
FIG. 1 shows the basic principal of a pay television system.

FIG. 1 shows a device 1, e.g. a microcomputer, used by the broadcasting company for generating data relating to the broadcast and useful for the subscribers. Those data are associated at point 2 to the video signal supplied by a video type recorder 3 or any other system. Usually, such data are transmitted by the lines corresponding to the return of the vertical scanning of the video signal.

The video signal and the data associated thereto are then scrambled by means of a scrambling device 4 which renders the picture unusable by a non-subscriber. This enciphered signal is transmitted through Hertz links, satellites or cables means, to each subscriber's receiver 5, and an unscrambler or decoder 6 permits to restore the broadcast in a television set 7 with a normal quality.

Figure 2:
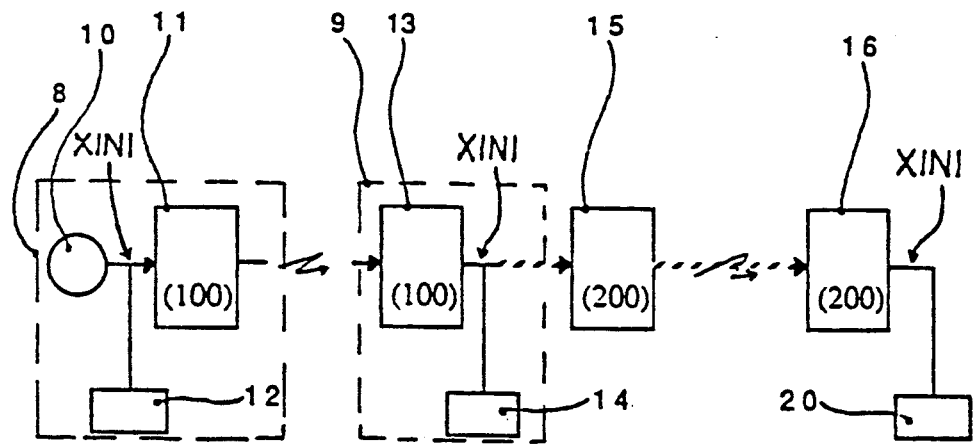
FIG. 2 represents the operating principal of a pay-television system using a memory card, known in the art, and also illustrates a possible piracy mode.

FIG. 2 shows a scrambling system 8 at the emission stage and an unscrambling system 9, also called decoder, at the receiving stage at the client who has subscribed to this pay-television system.

In scrambling system 8, one can see a random digit generator 10 which supplies an initialization word XINI; this initialization word is sent to the input of a main card 11. This main card enciphers the initialization word XINI according to a predetermined key 100, the so enciphered word being associated with the video signal. At the same time, the initialization word XINI serves to initialize a pseudo-random generator 12 which thus supplies at the outpout a given code table designed to scramble the video picture and sound. At the receiving stage 9, there is a subscriber card 13 which serves to decipher the enciphered initialization word in the state it is received. Deciphering is carried out with the same key 100 in order to give at the output the deciphered initialization word XINI. This XINI word is then sent for initializing a pseudo-random generator 14 whose design is identical to the one of pseudo-random generator 12 at the emission. Consequently, generator 14 provides a code table identical to the one generated at the emission stage and thus permits unscrambling of the emitted video picture. It is possible to modify, at any time, for example every second or every ten seconds, the initialization word XINI without impairing the authorized broadcast at the subscriber's home.

This system adequately operates but may allow sophisticated piracy actions by well informed persons as will be explained hereinafter. First, it is to be noted that several broadcasting companies can use together the same decoding network of memory cards and even use the same memory cards. A broadcasting company A can write its key 100 and its rights and another broadcasting company B can independently write its key 200 and its rights on the same card decoding network. A well informed person, for example a person working for a broadcasting company, can easily with a subscriber card 13 decipher the initialization word XINI and extract it. This person can then get a main card 16 programmed so as to encipher the initialization word according to the key 200 of another broadcasting company B and then send this word together with the broadcast video signal of the emissions of the broadcasting company A into a network, for example a cable network, to which clients of broadcasting company B are connected. Those clients or subscribers having cards 16 with a key 200 can then receive the broadcast of broadcasting company A, transferred in the broadcasting company B system.

Figure 3:
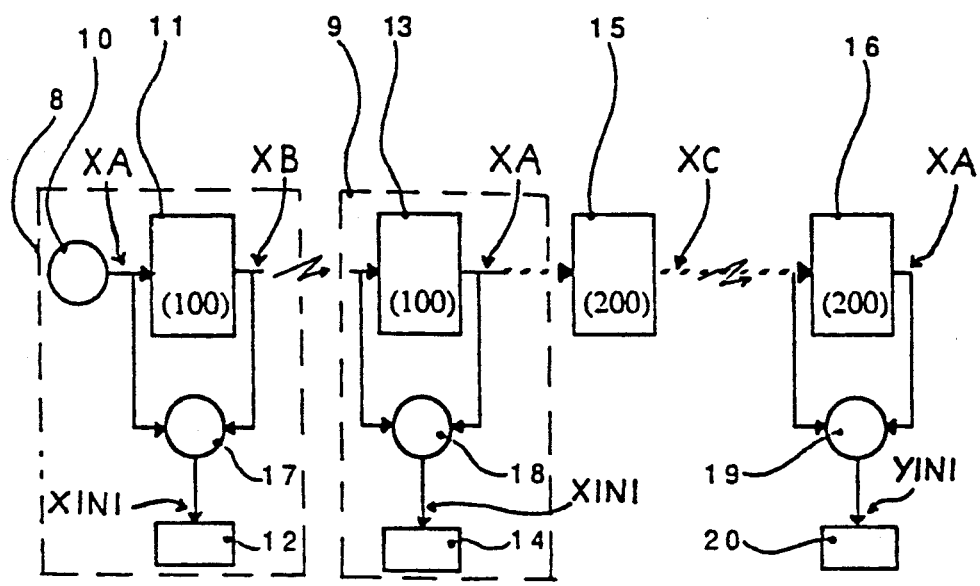
FIG. 3 represents the operating principal of a pay-television system according to the invention and also illustrates how piracy actions can be prevented.

FIG. 3 shows a pay-television system with a memory card according to the invention. It will be clear that with such a system it is impossible to pirate in the way described hereinabove. In FIG. 3 some components are identical to those of the prior art such as shown in FIG. 2 and are labelled with same references. The random-digital generator 10 supplies a digital number hereinafter called random code XA. Main card 11 enciphers recording to key 100 this random code XA ; the subscriber cards 13 deciphers this random code XA according to key 100 to find back a same code XA.

A first device 17 receives at the input, on the one hand, the random code XA and, on the other hand, the code XB scrambled by the main card 11 and carries out a determined digit combination of those two codes. This combination constitutes the initialization word XINI of the pseudo-random generator 12 intended to form a code table designed to scramble the video signal. Similarly, a second device 18 receives at the inputs, on the one hand, the scrambled code XB and, on the other hand, the code descrambled by the subscriber card 13. This code is identical to XA and the second device 18 carries out a digital combination of those two codes, this combination being identical to the combination of the first device 17, in such way that the pseudo-random generator 14 receives the same initialization word XINI as generator 12 and supplies an identical code table designed to carry out descrambling of the video signal. The digital combination of devices 17 and 18 can simply be constituted by an Exclusive OR function or can implement any function known per se whose reciprocal function can only be determined by a complete test. It can be seen that whatever the combination function used, identical in both devices 17 and 18, the two pseudo-random generators 12 and 14 will be initialized at the same time and descrambling will always be adequately obtained, even if code XA is changed. On the contrary, if the piracy process described hereinabove in a conventional system is used in this case it will be noted that it does not work. Indeed the informed person will be able from a subscriber card 13 to find the code XA but after this person will encipher the code XA using his own key 200 and will so an enciphered initialization code XC different of XA. In the decoder the subscriber card will decipher XC and so restitute XA. However digital combination of device 19 although it is identical to devices 17 and 18 will give an initialization word YINI for the pseudo-random generator 20 different from the initialization word XINI for the generators 12 and 14 because device 19 receives XC and XA codes and not XB and XA codes.

While the invention has been particularly shown and described with reference to embodiment thereof, it will be understood by skilled in the art that various changes in structure and components may be made without departing from the scope of the invention.

I claim:

1. A pay-television system using a memory card associated with a decoder, wherein, on an emission side, a digital generator (10) supplies a random code (XA) which is sent to an input of a main card (11) which enciphers said random code, by using a predetermined key (100), and the enciphered code is included in a broadcasted video signal, a first device (17) has inputs and receives at its inputs, on the one hand, said random code (XA) and, on the other hand, the code (XB) enciphered by the main card (11) and carries out a determined digit combination of those two codes, this combination forming the initialization word of a pseudo-random generator (12) which is intended to supply a code table designed to scramble the video signal, and on the reception side, the decoder receives the enciphered code (XB) that is deciphered by a subscriber card (13), a second device (18) has inputs and receives at its inputs, on the one hand, the enciphered code (XB) and, on the other hand, the code deciphered (XB) by the subscriber card (13) and carries out a digital combination of those two codes, this combination being identical to the one of the first device (17), the result of this combination constituting the initialization word for another pseudo-random generator (14) supplying a code table identical to the one of the emission, this code table being designed to unscramble the video signal.

2. A pay-television system according to claim 1 wherein the first (17) nd the second (18) devices carry out the same digital combination whose function is such that the reciprocal function can be determined only by a complete test.

3. A pay-television system according to claim 2 wherein the first (17) and the second (18) devices carry out the same digital combination of binary numbers by way of using an exclusive or logical function.

* * * * *